(12) United States Patent
Schobben et al.

(10) Patent No.: US 12,472,358 B2
(45) Date of Patent: Nov. 18, 2025

(54) METHOD OF OPERATING AN ELECTRICAL STIMULATION DEVICE WITH TWO OR MORE STIMULATION ENERGY SUPPLIES, AND A STIMULATING DEVICE

(71) Applicant: SALVIA BIOELECTRONICS B.V., Eindhoven (NL)

(72) Inventors: Daniël Schobben, Eindhoven (NL); Hubert Martens, Eindhoven (NL); Stephen Mark Gee, Eindhoven (NL); Koen Weijand, Eindhoven (NL)

(73) Assignee: Salvia BioElectronics B.V., Eindhoven (NL)

( * ) Notice: Subject to any disclaimer, the term of this patent is extended or adjusted under 35 U.S.C. 154(b) by 253 days.

(21) Appl. No.: 17/640,974

(22) PCT Filed: Sep. 6, 2020

(86) PCT No.: PCT/IB2020/058294
§ 371 (c)(1),
(2) Date: Mar. 7, 2022

(87) PCT Pub. No.: WO2021/044387
PCT Pub. Date: Mar. 11, 2021

(65) Prior Publication Data
US 2022/0339443 A1    Oct. 27, 2022

(30) Foreign Application Priority Data
Sep. 6, 2019 (NL) ..................................... 2023791

(51) Int. Cl.
*A61N 1/36* (2006.01)
(52) U.S. Cl.
CPC ....... *A61N 1/3615* (2013.01); *A61N 1/36178* (2013.01)

(58) Field of Classification Search
CPC ...... A61N 1/05; A61N 1/0526; A61N 1/0551; A61N 1/36017; A61N 1/36021;
(Continued)

(56) References Cited

U.S. PATENT DOCUMENTS 6,934,580 B1 * 8/2005 Osorio ................. A61B 5/4094
607/45
7,450,992 B1   11/2008 Cameron
(Continued)

FOREIGN PATENT DOCUMENTS

CN    101648053 B    2/2010
CN    103052424 B    4/2013
(Continued)

OTHER PUBLICATIONS

Office Action for JP 2022-515085 from the Japan Patent Office, Mailed Sep. 5, 2024.
(Continued)

*Primary Examiner* — Amanda K Hulbert
(74) *Attorney, Agent, or Firm* — Fresh IP PLC; Clifford D. Hyra; Aubrey Y. Chen

(57) ABSTRACT

Conventional devices deliver a degree of electrical charge into biological tissues; to satisfy regulatory and safety concerns, measures are taken to maintain a zero-charge residual at the stimulation site.

Disclosed herein is a method of controlling electrical energy provided by a stimulation device to one or stimulation electrodes comprised in the device, the device including: a first stimulation electrode; a pulse energy controller for transferring electrical energy as one or more electrical stimulation pulses to the first stimulation electrode; the pulse energy controller further including two or more stimulation energy supplies for each supplying electrical energy substantially concurrently to the first stimulation electrode as a (Continued)

first pulse; and each supplying electrical energy separately to the first stimulation electrode as a second pulse.

A simpler, more accurate and less-expensive control of stimulation may be provided by considering each energy supply as an energy building block, which may be selected as required.

19 Claims, 7 Drawing Sheets

(58) Field of Classification Search
CPC ............ A61N 1/36034; A61N 1/36071; A61N 1/36075; A61N 1/36146; A61N 1/3615; A61N 1/36153; A61N 1/36157; A61N 1/36178

See application file for complete search history.

(56) References Cited

U.S. PATENT DOCUMENTS

| | | | |
|---|---|---|---|
| 2006/0074450 A1 | 4/2006 | Bovoja et al. | |
| 2007/0123963 A1 | 5/2007 | Krulevitch | |
| 2009/0062883 A1 | 3/2009 | Meadows | |
| 2010/0148345 A1 | 6/2010 | Eckhardt et al. | |
| 2012/0209346 A1* | 8/2012 | Bikson | A61N 1/36034 607/45 |
| 2017/0368358 A1 | 12/2017 | Doguet | |
| 2018/0110992 A1 | 4/2018 | Parramon | |
| 2019/0001139 A1 | 1/2019 | Mishra | |

FOREIGN PATENT DOCUMENTS

| | | |
|---|---|---|
| CN | 103796715 B | 5/2014 |
| CN | 104096313 B | 10/2014 |
| CN | 105188838 B | 12/2015 |
| EP | 2540340 A1 | 1/2013 |
| EP | 2958619 B1 | 12/2016 |
| JP | H05115565 A | 5/1993 |
| JP | 2007167636 A | 7/2007 |
| JP | 2011505903 A | 3/2011 |
| JP | 2016507335 A | 3/2016 |

OTHER PUBLICATIONS

Search Report by Intellectual Property India for Application No. 202227012600, Mailed Aug. 26, 2024, 6 pages.

Office Action issued in CN Application No. 202080062747.3, dated Apr. 1, 2025, 6 pages.

Hearing Notice issued in IN Application No. 202227012600, dated Aug. 18, 2025, 4 pages.

* cited by examiner

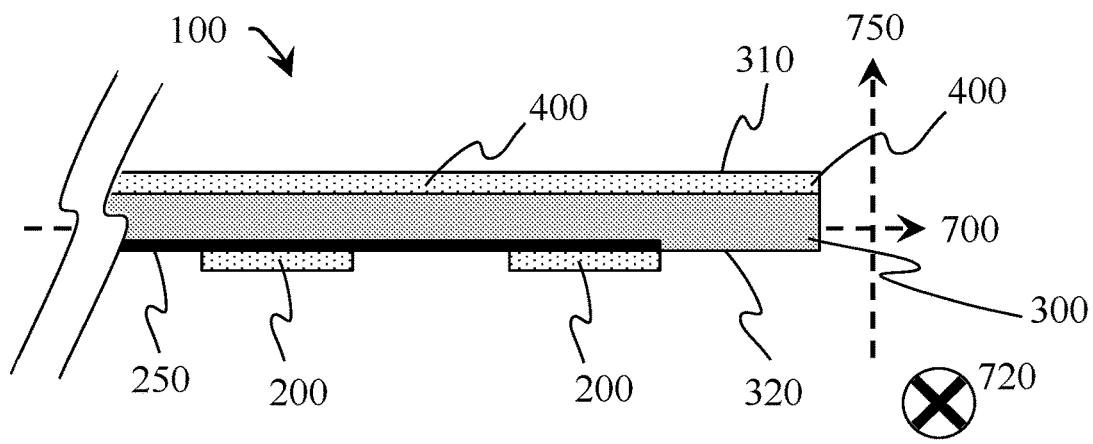
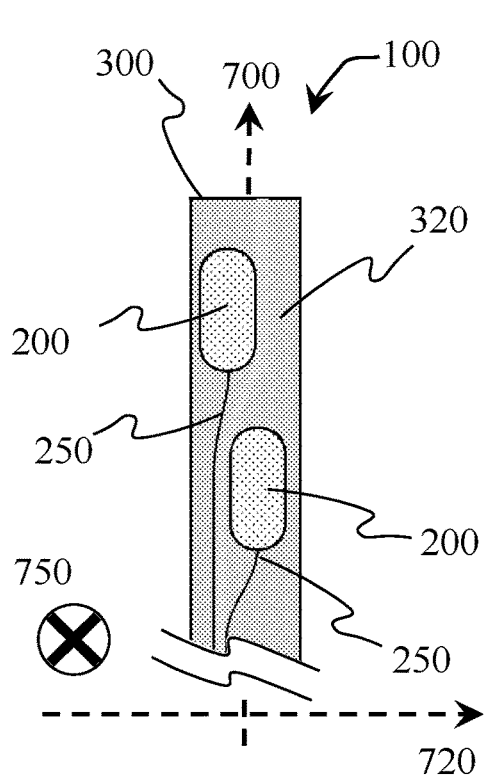 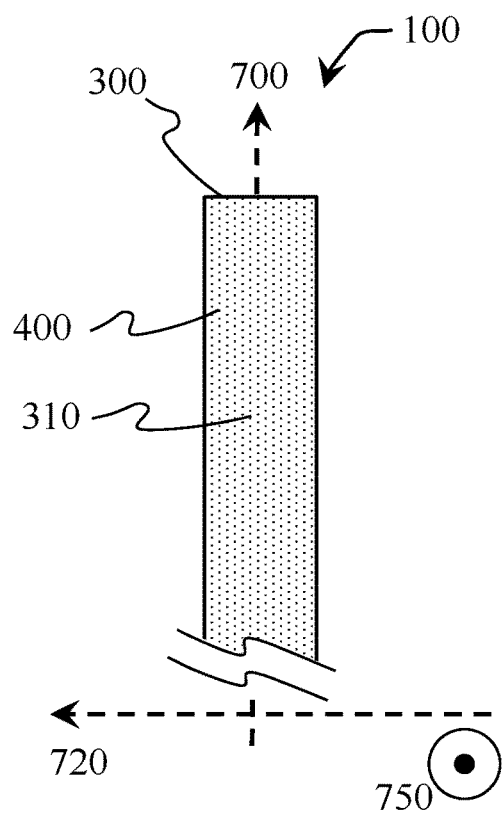
Fig. 1A
Fig. 1B  Fig. 1C

METHOD OF OPERATING AN ELECTRICAL STIMULATION DEVICE WITH TWO OR MORE STIMULATION ENERGY SUPPLIES, AND A STIMULATING DEVICE

FIELD

The present disclosure relates to a method of controlling electrical energy in an electrical stimulation device for providing electrical stimulation, and a stimulation device. In particular, this disclosure relates to a method of controlling electrical energy provided by a stimulation device to one or more stimulation electrodes comprised in the device.

BACKGROUND

Electrical stimulation systems may be used to deliver electrical stimulation therapy to patients to treat a variety of symptoms or conditions such as headaches, lower back pain and incontinence. The system may comprise one or more devices, and be at least partially implantable.

In many electrical stimulation applications, it is desirable for a stimulation device, typically comprising a therapeutic lead (a lead comprises stimulating electrodes and interconnections), to provide electrical stimulation as safely as possible. Conventional devices may deliver a degree of electrical charge into biological tissues; to satisfy regulatory and safety concerns, measures are taken to maintain a substantially zero-charge residual at the stimulation site.

The most common solution is to include a DC-blocking capacitor in series with each stimulating electrode. This reduces the risk of continuous current flow (DC) through the electrode, either blocking continuous current component substantially completely or reducing it to a negligible level. A physically large capacitor is usually required for a blocking capacitor, making miniaturization more difficult and increasing the cost as one capacitor is required per electrode.

US application US 2018/0110992 A1 describes producing multi-phasic fields at a neuromodulation site using electrodes. A first-polarity electrical charge is injected to a target region, and a second-polarity electrical charge opposite the first-polarity electrical charge is injected to portions of the neuromodulation site other than the target region to essentially neutralize the first-polarity charge injected while maintaining at least a portion of the first-polarity charge at the target region.

EP application EP 2540340 A1 describes an electrical stimulation apparatus including a medical device. The medical device includes: a housing component having at least one electrically conductive area, a plurality of conductors configured to be electrically coupled to a distal electrode array, and a stimulation circuit with a plurality of controllable stimulation channels. A first subset of the stimulation channels is electrically coupled to the conductors. A second subset of the stimulation channels is electrically coupled to the electrically conductive area of the housing component. The stimulation circuit is operable to simultaneously create a first stimulation path in the electrode array and a second stimulation path that extends from the electrode array to the housing component.

US application US 2019/0001139 A1 describes a medical apparatus for a patient comprising an implantable system having a first implantable device with at least one implantable functional element configured to deliver stimulation energy to tissue of the patient; and an implantable controller configured to provide a stimulation waveform to the at least one implantable functional element, the stimulation waveform comprising one or more stimulation parameters. The apparatus is configured to randomly vary at least one of the one or more stimulation parameters. Stimulation parameters may also be randomly varied.

US application US 2009/0062883 A1 describes a spinal cord stimulation (SCS) system which includes multiple electrodes, multiple, independently programmable, stimulation channels within an implantable pulse generator (IPG) which channels can provide concurrent, but unique stimulation fields, permitting virtual electrodes to be realized. A real-time clock can provide an auto-run schedule for daily stimulation. A bi-directional telemetry link informs the patient or clinician the status of the system, including the state of charge of the IPG battery.

It is an object of embodiments of the invention to provide an improved stimulation device that provides a high degree of charge balancing with a simplified control method which may be performed with lass complex hardware. In particular, in some cases, the less complex hardware may be more easily miniaturized.

SUMMARY

According to a first aspect of the present disclosure, there is provided a method of controlling electrical energy provided by a tissue stimulation device one or more stimulation electrodes comprised in the device, the device comprising: a first stimulation electrode, configured to transmit energy, in use, to human or animal tissue as one or more stimulation pulses; a pulse energy controller, configured and arranged to transfer electrical energy, during use, as one or more electrical stimulation pulses to the first stimulation electrode; the pulse energy controller further comprising two or more stimulation energy supplies, wherein the method further comprises: supplying electrical energy substantially concurrently to the first stimulation electrode from each of the two or more stimulation energy supplies as a first pulse; and supplying electrical energy separately to the first stimulation electrode from each of the two or more stimulation energy supplies as a second pulse.

A simpler control of stimulation may be provided by considering each energy supply as an energy building block, which may be selected as required. Using power supplies in this way reduces the requirements that they be very accurate and very stable. The electrical charge that they are supplying does not even need to be precisely predetermined and/or controlled. —the minimum requirements are that they are relatively constant over at least one pulse cycle. By requiring less functionality, the size and cost of the power supply design may be reduced. The pulse energy controller may be configured and arranged to select the instance at which an energy block is applied, to which of the electrodes, the energy is applied, and the polarity.

By using the same supplies for different pulses, a higher degree of reproducibility may be provided. This may be advantageous in applications where tissue dosage over a plurality of treatment cycles is to be monitored—in conventional systems, measurements of the actual currents and/or voltages may be preferred. However, with more reproducible pulses, it may be sufficient to limit the monitoring to the supplies being used and the number of times each supply is used.

According to a further aspect of the current disclosure, a method is provided wherein the two or more energy supplies are configured and arranged to provide electrical energy as a predetermined and/or controlled voltage, a predetermined and/or controlled current, a predetermined and/or controlled energy, a predetermined and/or controlled charge, a predetermined and/or controlled power, or any combination thereof.

Any convenient type of electrical control may be used, such as current, voltage, energy, power, charge, dose control and any combination thereof.

According to a still further aspect of the current disclosure, a method is provided wherein the first and second pulses have substantially different polarity. Additionally or alternatively, a method may be provided wherein each of the two or more energy supplies are configured and arranged to provide pulses as anodic and/or cathodic energy pulses.

For charge balancing, the pulses should have an opposite polarity. Traditionally the stimulation of tissue has adopted cathodic pulses for stimulation and anodic pulses (with the opposite polarity) for charge neutralization (also called charge balancing). By using two or more supplies, the energy output of each supply may be configured and arranged to be substantially constant; if the same supplies are used for both pulses, and they are, for example, cathodic and anodic pulses, the anodic and cathodic charges are substantially equal.

Inherently, the same amount of energy may be applied in each pulse because the same energy building block is applied, as a sub-pulse, as at least a portion of the anodic pulse, and the same energy building block is applied, as a sub-pulse, as at least a portion of the cathodic pulse (but with substantially the opposite polarity). Each sub-pulse has a predetermined and/or controlled amplitude and duration provided by a separate power supply. The energy applied is inherently balanced without requiring more complicated and expensive hardware and/or software. If the energy supplies are configured and arranged to provide a certain level of charge, the charge applied is inherently balanced without requiring more complicated and expensive hardware and/or software.

Compared to known solutions, a high degree of balancing is achieved with a hardware configuration that uses a relatively simple polarity switching for each simplified supply.

According to yet another aspect of the current disclosure, a method is provided wherein each of the two or more stimulation energy supplies, are configured and arranged to supply electrical energy substantially simultaneously as the first pulse. Additionally or alternatively, a method is provided wherein each of the two or more stimulation energy supplies, are configured and arranged to supply electrical energy substantially consecutively as the second pulse.

In general, a method is provided wherein each of the two or more energy supplies are configured and arranged to provide electrical energy: substantially simultaneously, at least partly simultaneously, substantially consecutively, at least partly consecutively, with a predetermined and/or controlled time interval between the pulses, or any combination thereof. The ability to switch the supplies at different moments in time provides a high degree of control. By overlapping or separating in time the use of the supplies, the combined output voltage, current, power, energy or dose may also be predetermined and/or controlled. This may allow different shapes of waveform to be used, such as a ramp.

By applying them substantially concurrently for the first pulse, and substantially non-consecutively (or substantially consecutively), the average amplitude of the second pulse is less than the average amplitude of the first pulse. The ratio between the average amplitude of the second pulse and the first pulse may be predetermined and/or controlled by determining the instances that each energy supply is applied, and the polarity. In the case that for the cathodic pulse and substantially non-concurrently for the anodic pulse, the average amplitude of the anodic pulse may be substantially less than the average amplitude of the cathodic pulse. This lower amplitude reduces the risk that the therapeutic effect will be reduced, for example, by corrosion of an electrode and/or neural fatigue.

According to another aspect of the current disclosure, a method is provided wherein the two or more energy supplies are configured and arranged to provide the first and second pulses with an average amplitude ratio of less than or equal to 1:2.

By reducing the amplitude of the balancing pulse to less than half than the stimulation pulse amplitude, the risk of a reduction in therapeutic effect is greatly reduced. By applying them substantially concurrently for the cathodic pulse and substantially non-concurrently for the anodic pulse, the amplitude of the anodic pulse may be approximately half the amplitude of the cathodic pulse. With four or more supplies, the amplitude of the anodic pulse may be approximately one quarter the amplitude of the cathodic pulse, increasing the chance that the therapeutic effect is maintained According to yet another aspect of the current disclosure, a method is provided wherein the two or more energy supplies are configured and arranged to provide the first and second pulses with an average amplitude ratio that is at least partially determined by the number of energy supplies which may be operated substantially concurrently.

In some cases, the number of power supplies provides a straightforward way to indicate the approximate ratio in average amplitude between stimulation pulses and balancing pulses. For example, with two supplies, a ratio of approximately two may be provided. With three supplies, a ratio of approximately three may be provided. With four supplies, a ratio of approximately four may be provided.

According to a further aspect of the current disclosure, a method is provided wherein each of the two or more energy supplies are configured and arranged to supply electrical energy separately to the first stimulation electrode as a third pulse. Additionally or alternatively, a method is provided wherein the two or more energy supplies are configured and arranged to provide the second and third pulses with a substantially different polarity to the first pulse. Additionally or alternatively, a method is provided wherein the two or more energy supplies are configured and arranged: to provide the second and third pulses with a predetermined and/or controlled time interval between them; and to provide the first pulse during the time interval.

Additional pulses may be provided, or one of the pulses may divided into one or more sub-pulses. By using two or more supplies according to embodiments the invention, the distribution of energy between the sub-pulses may be predetermined and/or controlled to a higher degree. For example, a balancing pulse may be separated into two sub-pulses or pulse parts—one pulse part may be provided before a stimulation pulse, and the other pulse part afterwards. In other words, to provide two balancing pulse parts with a predetermined and/or controlled time interval between them. Similarly, a stimulation pulse may be separated into two sub-pulses or pulse parts.

According to another aspect of the current disclosure, a method is provided wherein each of the two or more energy supplies are configured and arranged to be provide energy pulses of substantially opposite polarity such that the net charge transferred is substantially zero.

According to still another aspect of the current disclosure, a method is provided wherein the device further comprises one or more DC-blocking capacitors, electrically connected in series with one or more return electrodes.

According to yet another aspect of the current disclosure, a method is provided wherein the device is further configured and arranged to electrically short one or more stimulation electrodes to one or more return electrodes after providing one or more pulses.

According to another aspect, a stimulation device is provided which may be operated according to any of the methods disclosed herein. The stimulation device comprises: an elongated implantable distal end comprising a flexible substrate having a plurality of polymer layers and one or more interconnection layers, the substrate further comprising: a first stimulation electrode, configured to transmit energy, in use, to human or animal tissue as one or more stimulation pulses; the stimulation device further comprising: one or more return electrodes, configured to provide, in use, a corresponding electrical return for the first stimulation electrode; and a proximal end, comprising a pulse energy controller, configured and arranged to transfer electrical energy, during use, through the one or more interconnection layers as one or more electrical stimulation pulses to the first stimulation electrode: wherein the pulse energy controller further comprises two or more stimulation energy supplies, configured and arranged: to supply electrical energy substantially concurrently to the first stimulation electrode from each of the two or more stimulation energy supplies as a first pulse; and to supply electrical energy separately to the first stimulation electrode from each of the two or more stimulation energy supplies as a second pulse.

According to a still further aspect, a stimulation device is provided wherein the substrate comprised in the elongated implantable distal end has a maximum thickness of approximately 0.25 mm.

According to another aspect, a stimulation device is provided wherein the one or more return electrodes are: comprised in the distal end, arranged proximate the first stimulation electrode, comprised in the proximal end, arranged proximate the pulse energy controller, or any combination thereof.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIGS. 1A, 1B & 1C depict an example of an implantable distal end of a stimulation device;

DETAILED DESCRIPTION

Figure 2A:
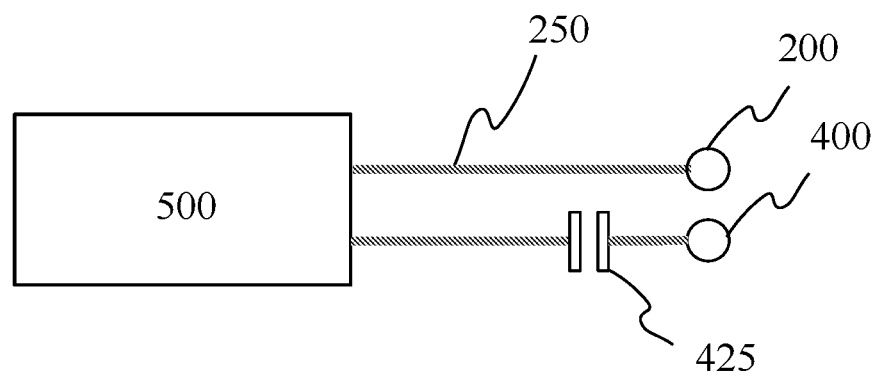
FIGS. 2A and 2B depict schematically two embodiments of a pulse energy controller, suitable for providing electrical energy to the electrodes.

In the following detailed description, numerous non-limiting specific details are given to assist in understanding this disclosure.

In general, stimulation devices described herein may comprise a stimulation energy source and an implantable end—the implantable end comprises one or more stimulation electrodes. "Implantable end" means that at least this section of the stimulation system is configured and arranged to be implanted. Optionally, one or more of the remaining sections of the stimulation systems may also be configured and arranged to be implanted.

FIGS. 1A, 1B & 1C depict longitudinal cross-sections through a first embodiment of an implantable distal end of a stimulation device 100 comprising:

an elongated substrate 300, disposed along a longitudinal axis 700, the substrate having a first 310 and second 320 surface disposed along substantially parallel transverse planes 700, 720. As depicted, the first surface 310 lies in a plane comprising the longitudinal axis 700 and a first transverse axis 720—the first transverse axis 720 is substantially perpendicular to the longitudinal axis 700. As depicted, the plane of the first surface 310 is substantially perpendicular to the plane of the cross-section drawing (substantially perpendicular to the surface of the paper). The substrate 300 has a thickness or extent along a second transverse axis 750—this second transverse axis 750 is substantially perpendicular to both the longitudinal axis 700 and the first transverse axis 720—it lies in the plane of the drawing (along the surface of the paper) as depicted. The first surface 310 is depicted as an upper surface and the second surface 320 is depicted as a lower surface.

To clarify the different views, the axes are given nominal directions:

the longitudinal axis 700 extends from the proximal end (not depicted) on the left, to the distal end, depicted on the right of the page;

the first transverse axis 720 extends into the page as depicted; and the second transverse axis 750 extends from bottom to top as depicted.

For example, the elongated substrate 300 may comprise an elastomeric distal end composed of silicone rubber, or another biocompatible, durable polymer such as siloxane polymers, polydimethylsiloxanes, polyurethane, polyether urethane, polyetherurethane urea, polyesterurethane, polyamide, polycarbonate, polyester, polypropylene, polyethylene, polystyrene, polyvinyl chloride, polytetrafluoroethylene, polysulfone, cellulose acetate, polymethylmethacrylate, polyethylene, and polyvinylacetate. Suitable examples of polymers, including LCP Liquid Crystal Polymer), are described in "Polymers for Neural Implants", Hassler, Boretius, Stieglitz, Journal of Polymer Science: Part B Polymer Physics, 2011, 49, 18-33 (DOI 10.1002/polb.22169), In particular, Table 1 is included here as reference, depicting the properties of Polyimide (UBE U-Varnish-S), Parylene C (PCS Parylene C), PDMS (NuSil MED-1000), SU-8 (Micro-Chem SU-8 2000 & 3000 Series), and LCP (Vectra MT1300).

Flexible substrates 300 are also preferred as they follow the contours of the underlying anatomical features very closely. Very thin substrates 300 have the additional advantage that they have increased flexibility.

Preferably, the flexible substrate 300 comprises an LCP, Parylene and/or a Polyimide. LCP's are chemically and biologically stable thermoplastic polymers which allow for hermetic sensor modules having a small size and low moisture penetration.

Advantageously, an LCP may be thermoformed allowing complex shapes to be provided. Very thin and very flat sections of an LCP may be provided. For fine tuning of shapes, a suitable laser may also be used for cutting. For example, LCP substrates 300 with thicknesses (extent along the second transverse axis 750) in the range 50 microns (um) to 720 microns (um) may be used, preferably 100 microns (um) to 300 microns (um). For example, values of 150 um (micron), 100 um, 50 um, or 25 um may be provided. Similarly, substrate widths (extent along the first transverse axis 720) of 2 mm to 20 mm may be provided using LCP, for example.

At room temperature, thin LCP films have mechanical properties similar to steel. This is important as implantable substrates 300 must be strong enough to be implanted, strong enough to be removed (explanted) and strong enough to follow any movement of the anatomical feature and/or structure against which it is implanted.

LCP belongs to the polymer materials with the lowest permeability for gases and water. LCP's can be bonded to themselves, allowing multilayer constructions with a homogenous structure.

In contrast to LCP's, polyimides are thermoset polymers, which require adhesives for the construction of multilayer substrates. Polyimides are thermoset polymer material with high temperature and flexural endurance.

An LCP may be used, for example, to provide a substrate having multilayers (not depicted)—in other words, several layers of 25 um (micron) thickness. Electrical interconnect layers may also be provided by metallization using techniques from the PCB (Printed Circuit Board) industry, such as metallization with a bio-compatible metal such as gold, silver or platinum. Electro-plating may be used. These electrical interconnect layers may be used to provide electrical energy to any electrodes.

Preferably, a low aspect ratio is used for the elongated substrate to reduce the chance of implantation problems— for example a ratio of height (thickness or extent along the second transverse axis 750) to width (extent along the first transverse axis 720) of more than 10, such as 0.3 mm high and 10 mm wide.

Although depicted as a substrate 300 with a substantially rectangular cross-section, substrates (and leads) having other cross-sections, such as square, trapezoidal may be used. The cross-section shape and/or dimensions may also vary along the longitudinal axis 700. Alternatively a substrate may be used with a substantially circular (which includes a circle, a flattened circle, a stadium, an oval and an ellipse) transverse cross-section—this may also be described as tubular or cylindrical.

The distal end of the device 100 depicted in FIG. 1 further comprises:

a stimulation electrode 200, comprised in the second surface 320 and configured to transmit energy, in use, to human or animal tissue (after implantation). In this example, it is electrical energy. The stimulation electrode 200 has a longitudinal extent along the longitudinal axis 700 and a transverse extent along a first transverse axis 720, the transverse axis 720 being substantially perpendicular to the longitudinal axis 700 and substantially parallel to the second surface 320.

"Comprised in the second surface" means that stimulation electrode 200 is relatively thin, and attached to the second surface 320. The electrode 200 may also be embedded in the second surface 320.

In general, one or more stimulation electrodes 200 may be provided. The number, dimensions and/or spacings of the stimulating electrodes 200 provided in the distal end 100 may be selected and optimized depending on the treatment—for example, if more than one electrode 200 is provided, each electrode 200 may provide a separate stimulation effect, a similar stimulation effect or a selection may be made of one or two electrodes 200 proximate the tissues where the effect is to be created. The electrodes 200 may comprise a conductive material such as gold, silver, platinum, iridium, and/or platinum/iridium alloys and/or oxides.

FIG. 1B depicts a stimulation electrode 200, elongated along the longitudinal axis 200. Although an oval cross-section is suggested in FIGS. 1A and 1B, any shape may be used, such a square, rectangular, triangular, polygonal, circular, elliptical, oval, and round. An elongated electrode (or strip electrode) may also be used.

The distal end 100 of the device of FIG. 1 further comprises:

optionally, one or more return (or ground) electrode 400, configured to provide, in use, a corresponding electrical return for one or more stimulation electrodes 200. In other words, the electrical return 400 closes the electrical circuit. Any suitable configuration and arrangement may be provided. Additionally or alternatively, one or more return (ground) electrodes may be provided:

proximate the one or more electrodes 200, at a distal end 100 of the device;

proximate a source of electrical energy (not depicted, see below), at a proximal end of the device;

comprised in the first surface 310;

comprised in the second surface 320;

and any combination thereof.

In some descriptions of conventional stimulation devices, the return electrode may be referred to as an anode. Traditionally, this has been provided via the housing of an IPG (Implantable Pulse Generator). Stimulation electrodes may similarly be referred to as cathodes.

The one or more return electrodes 400 may comprise a conductive material such as gold, silver, platinum, iridium, and/or platinum/iridium alloys and/or oxides.

A distal end (or lead) 100 suitable for implant may comprise, for example, 12 stimulation electrodes over a length of 15 cm. A stimulation electrode may have dimensions in the order of 6 to 8 mm along the longitudinal axis 700 and 3 to 5 mm along the first transverse axis 720, so approximately 18 to 40 square mm ($mm^2$). If a strip of 4 mm wide (extent along the first transverse axis 720) is provided as a return electrode, then a length (extent along the longitudinal axis 700) 4.5 to 10 mm also provides a tissue contact-area of 18 to 40 square mm ($mm^2$).

The distal end 100 of the device of FIG. 1 further comprises:

one or more electrical interconnections 250 may also be provided configured to provide the electrode 200 with electrical energy. They may be comprised in the first surface 310, the second surface 320, in the substrate between the surfaces 310, 320, and any combination thereof.

Additionally or alternatively, the substrate 300 may be a multilayer, comprising one or more electrical interconnection layers to provide the electrode 200 with electrical energy. In use, the electrical interconnections are connected to a source of electrical power (not depicted). If an LCP multilayer is used, the thickness (extent of the substrate 300 along the second transverse axis 750 or the perpendicular distance between the first surface 310 and the second surface 320) may be typically approximately 150 um (micron) in the sections with no electrodes 200 or interconnections, 250 um in the sections with an electrode 200, and 180 um in the sections with an electrical interconnection 250. If multilayers are used, electrical interconnection layers of 25 um (micron) may be used, for example.

FIG. 1B depicts a view of the second surface 320 of the implantable distal end 100 of the device depicted in FIG. 1A. In other words, the second surface 320 is depicted in the plane of the paper, lying along the longitudinal axis 700 (depicted from bottom to top) and in the first transverse axis 720 (depicted from left to right). The second transverse axis 750 extends into the page. This is the view facing the animal or human tissue which is stimulated (in use). The first surface 310 is not depicted in FIG. 1B, but lies at a higher position along the second transverse axis 750 (into the page), and is also substantially parallel to the plane of the drawing.

The substrate 300 extends along the first transverse axis 720 (considered the width of the distal end 100 of the stimulation device) between two extents.

The distal end 100 of the device may be implanted by first creating a tunnel and/or using an implantation tool.

The one or more return electrode 400 is depicted in FIGS. 1A and 1C, but not in FIG. 1B.

After implantation of the distal end 100 of the device, a source of energy may be configured and arranged to provide, in use, electrical energy to the stimulation electrode 200 with respect to the electrical return applied to the one or more return electrode 400.

This source of electrical energy may be, for example, disposed at a proximal end of the stimulation device 100:
- an energy source, such as a pulse generator (not depicted, see below), directly connected to the one or more interconnections 250; and/or
- one or more energy receivers (not depicted, see below), such as one or more conductors, directly connected to the one or more interconnections 250. The one or more conductors, such as coils with one or more windings, being configured to wirelessly receive energy from an energy source, such as a wireless pulse generator (not depicted, see below).

FIG. 2A depicts schematically a suitable source of electrical energy. For controlled stimulation, the source of electrical energy preferably comprises a first embodiment of a pulse energy controller 500, configured and arranged to provide stimulation energy through the one or more electrodes 200 as one or more electrical pulses. This changes the electrical potential and/or current applied to the one or more electrodes 200. This pulse energy controller 500 may be connected to the one or more electrodes 200 through one or more interconnections 250.

One or more return (or ground) electrodes 400 are typically provided, configured and arranged to provide, in use, a corresponding electrical return for one or more stimulation electrodes 200 which receive stimulation energy from this pulse energy controller 500. In other words, the electrical return 450 closes the electrical circuit.

Any suitable configuration and arrangement may be provided—for example, as depicted in FIG. 1, it is comprised in the first surface 310, proximate to one or more stimulation electrodes 200. Additionally or alternatively, one or more return (ground) electrodes 400 may be comprised in the first surface 310. Additionally or alternatively, one or more return (ground) electrodes may be provided proximate to this pulse energy controller 500.

This pulse energy controller 500 may, for example, comprise a suitably configured and programmed processor, controlling one or more parameters of the stimulation energy pulses, such as an intensity, a duration, a waveform shape, a frequency, and a repetition rate using one or more software or firmware methods. Additionally or alternatively, a hardware-based solution may be used, such as a state-machine implemented in an ASIC (Application-Specific Integrated Circuit).

It may operate in a stand-alone mode, or it may be in regular communication with an external controller, or some combination thereof.

For example, therapy (treatment) pulses for stimulation provided to the electrodes 200 may be 100 microsecond to 1 millisecond wide, and repeated with 40 to 1000 Hz. For treatment of pain using Peripheral Nerve Stimulation (PNS), suitable pulse parameters may be: 0-10 Volt, in particular 0.5-4.0 Volt, average amplitude, with a current 0-10 mA, a 90-200 microseconds pulse width and a 50-400 Hz repetition rate.

A suitable pulse energy controller 500 may further comprise:
- a power supply, configured and arranged to provide stimulation energy, suitable for tissue stimulation, to the one or more electrodes 200. The energy may be provided to pairs of electrodes 200 as differential potentials and/or currents. Additionally or alternatively, one or more of the electrodes 200 may be configured as a return (or ground) electrode. Additionally or alternatively, one or more return electrodes 400 may be used as described above.
- a logic control, configured and arranged to control the transfer of the stimulation energy to the one or more electrodes 200, 400. For example, it may comprise one or more controllers connected to one or more clock generators.
- optionally, one or more monitors, configured and arranged to monitor one or more parameters relating to the operation of the pulse energy controller 500, such as one or more currents, voltages, energies, powers, charges, dose.

In conventional devices, one or more capacitors are provided between the pulse energy controller 500 and the one or more stimulation electrodes 200 to block a degree of continuous current (or an unwanted DC component). One of the insights upon which embodiments of the invention is based is that the blocking capacitors in the one or more electrodes 200 interconnections 250 may be omitted, and replaced functionally by one or more DC-blocking capacitors 425, electrically connected in series with one or more return electrodes 400. As the number of return electrodes 400 is typically much fewer than the number of stimulation electrodes 200, this results in an overall reduction in the number of DC-blocking capacitors 425 required. More advantageously, a single return electrode 400 may be used in some configurations, allowing a single DC-blocking capacitor 425 to be used. The capacitor 425 should be suitably dimensioned and suitably configured to deal with the energy being returned from the corresponding one or more stimulation electrodes 200.

Assuming
- a tissue impedance of approximately 1 kΩ. at typical stimulation frequencies (50-60 Hz);
- a charge for stimulation of approximately 2 μC (microcoulomb);
- a supply voltage of the device 100 is limited to no more than 13V DC; and
- Murata PICS3HV technology for the DC-blocking capacitor 425, with a maximum density of 90 nF/mm2, the capacitor value would be approximately:
- 300 nF, with an area of 5.3 mm2 for a stimulation current of 4 mA;
- 400 nF, with an area of 6.8 mm2 for a stimulation current of 7 mA; and
- 1 uF, with an area of 16 mm2 for a stimulation current of 10 mA.

It may therefore be advantageous to reduce the number of DC-blocking capacitors required when reducing the size of the device 100. Most preferably, a design requiring no DC-blocking capacitors may provide a suitable candidate for further miniaturization. Such a reduction in key components may also reduce the cost price of the device 100.

Figure 2B:
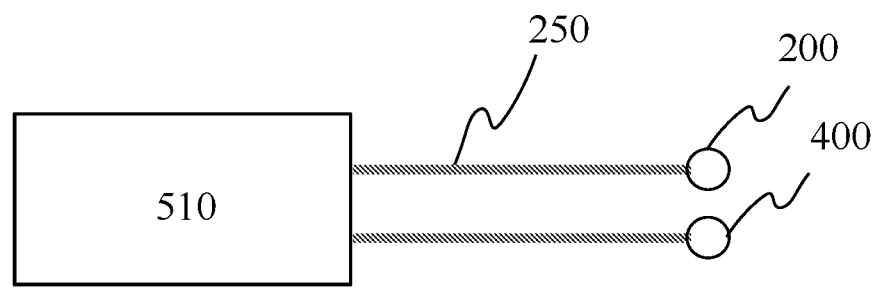

FIG. 2B depicts a second embodiment 510 of a pulse energy controller which is suitable for providing electrical energy to the electrodes 200, 400 depicted in FIG. 1. The second embodiment 510 is identical to the first embodiment 500 depicted in FIG. 2A. However, the second embodiment 510 is configured and arranged to operate without a DC-blocking capacitor in series with a return electrode 400.

The second embodiment 510 is further configured and arranged to provide at least partially charged balancing pulses, and in particular, bi-phasic charge balancing pulses. In the context of this disclosure, charge balancing pulses should be understood as pulses configured and arranged to provide charge balancing.

The basic principles are described in the article *Electrical stimulation of excitable tissue: design of efficacious and safe protocols* by Merrilla, Bikson & Jefferys, Journal of Neuroscience Methods 141 (2005) 171-198 (doi: 10.1016/j.jneumeth.2004.10.020). FIG. 3 of Merrilla et al. depicts common pulse type and parameters, including biphasic charge balancing.

Figure 3A:
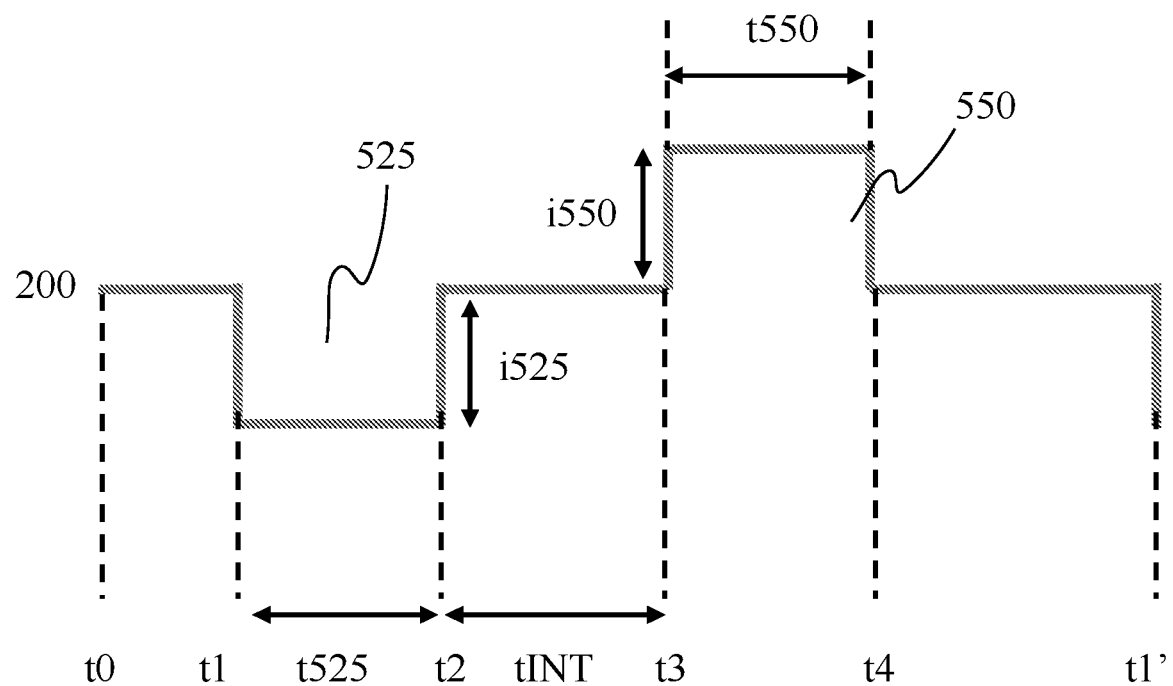
FIGS. 3A and 3B depict examples of biphasic, cathodic-leading pulses.

FIG. 3A of this disclosure depicts the basic parameters of such pulses:
- the pulses depicted 525, 550 represent current provided to a stimulation electrode 200 during a particular period of time. It may be advantageous for the pulse energy controller 510 to be configured and arranged to directly control the current delivered to the stimulation electrode 200. However, any convenient type of control may be used, such as voltage, energy, power, charge, dose control and any combination thereof.
- the current i525, i550 is indicated by the vertical extent of the pulse. The duration t525, t550 is indicated by the horizontal extent of the pulse.
- the two pulses 525, 550 are separated by a period of time tINT At t0, the current i is substantially zero.

At t1, the current provided to the electrode 200 is driven negative to current i525 for a time period t525—this is also called a cathodic pulse 525. In this example, this is the leading pulse 525, which is configured and arranged to be a stimulating pulse. During t525, a charge Q1 is injected to stimulate the tissue.

At t2, which is t1+t525, the current i of the first cathodic pulse 525 becomes substantially zero, and remains substantially zero during the interpulse interval, which is tINT. Increasing tINT may increase the effectiveness of the stimulation.

At t3, which is t2+tINT, the current provided to the electrode 200 is driven positive to current i550 for a time period t550—this is also called an anodic pulse 550. In this example, this is the balancing or reversal pulse 550. So, during t550, an opposite charge Q2 is injected, configured and arranged to at least partially balance Q1. Most preferably, the device 100 is configured and arranged to make Q2 substantially equal to Q1.

At t4, which is t3+t550, the current i of the first anodic pulse 550 becomes substantially zero, and remains substantially zero during until the end of the depicted period t1'.

At t1', the current is driven negative for the next cathodic pulse. The period t4 to t1' may be used for neutralization by shorting the one or more stimulation electrodes 200 to the one or more return electrodes 400 after providing one or more pulses 525, 550. This is preferably performed before the next pulse cycle starts.

For physiological reasons, the leading pulse 525 is usually cathodic—however, the skilled person will realise that the pulse energy controller 510 may be configured and arranged to provide an anodic leading pulse instead.

So, the pulses in FIG. 3A may be described as biphasic, cathodic-leading pulses for electrode stimulation. For treatment of pain using Peripheral Nerve Stimulation (PNS), suitable pulse parameters may be:
- the peak current of the first cathodic pulse i525 is substantially the same as the peak current of the first anodic pulse i550. It is approximately 4 mA.
- the duration of the first cathodic pulse t525 is substantially the same as the duration of the first anodic pulse t550. It is approximately 250 μs (microseconds).
- the time between the trailing edge of the first cathodic pulse 525 and the leading edge of the anodic pulse 550, or the interval tINT, is approximately 10-100 μs (microseconds).
- the time between the leading edge of the first cathodic pulse 525 and the leading edge of the subsequent cathodic pulse, or the repetition rate (t1 to t1') is approximately 50-400 Hz.

As described in Merrilla et al, the net charge injection is preferably substantially zero to reduce the risk of tissue damage, and to reduce the risk of a reduction in therapeutic effect. Without wishing to be bound by theory, it is believed that this reduction may be related to one or more factors, such as degradation (corrosion) of one or more electrodes 200 and/or neural fatigue. In general terms, the device 100 should be configured and arranged such that the cathodic charge Q1 (the peak current of the first cathodic pulse 525 multiplied by the duration) is substantially equal to the anodic charge Q2 (the peak current of the first anodic pulse 550 multiplied by the duration):

$$i525 \times t525(Q1) = i550 \times t550(Q2)$$

The second embodiment 510 of the pulse energy controller should preferably provide current sources with high accuracy for the output current i525, i550 and an accurate pulse duration t525, t550. In general, requiring more accuracy increases costs. In addition, when implementing in ASIC technology, a higher accuracy generally requires more components, which may translate to more square millimeters being needed. Again, this may make it more difficult to miniaturize the device 100.

There may be an additional problem relating to the reversal or balancing pulse (here anodic pulses). If the charge Q2 provided is too high, tissue proximate the stimulation electrode 200 may be stimulated to an undesired degree. As discussed in A Partial-Current-Steering Biphasic Stimulation Driver for Vestibular Prostheses by Constandinou, Georgiou & Toumazou, IEEE TRANSACTIONS ON BIOMEDICAL CIRCUITS AND SYSTEMS, VOL. 2, NO. 2, JUNE 2008 (doi: 10.1109/TBCAS.2008.92723), using an extended anodic pulse with reduced amplitude may compensate for charge distribution and may reduce the risk of a reduction in the therapeutic effect.

Figure 3B:
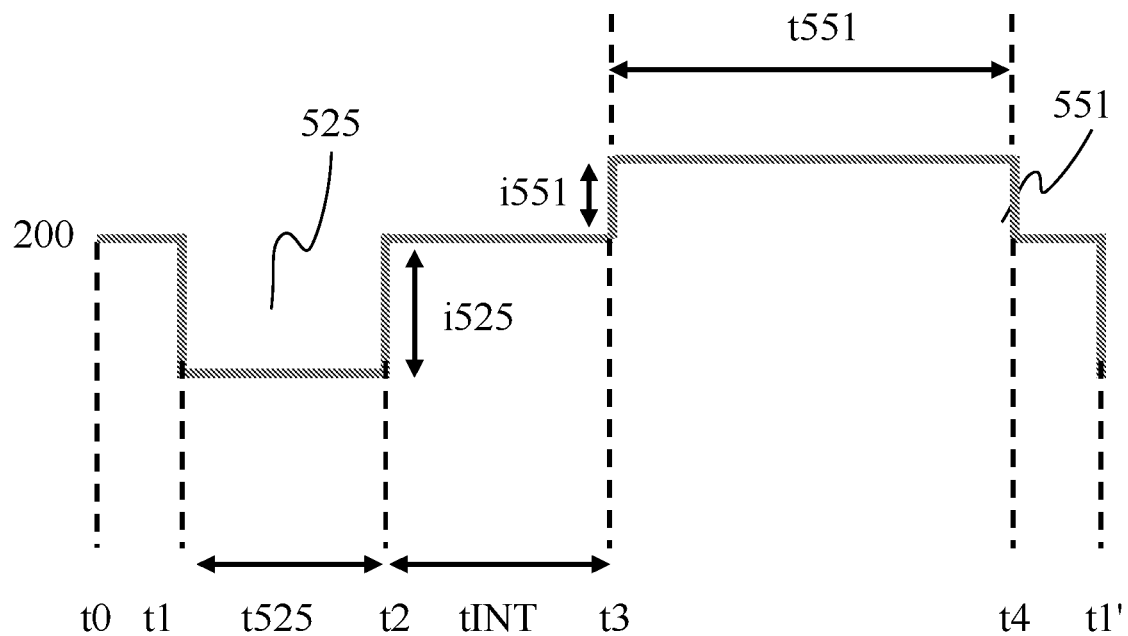

FIG. 3B of this disclosure depicts a further example of biphasic, cathodic-leading pulses. The first cathodic pulse 525 is the same as in FIG. 3A. The second anodic pulse 551 is a doubled form (substantially twice as long in duration) of the first anodic pulse 550 in FIG. 3A with substantially the same charge. More specifically:

At t0, the current i is substantially zero.

At t1, the current provided to the electrode 200 is driven negative to current i525 for a time period (duration) t525—this is again a cathodic, leading pulse 525. During t525, a charge Q1 is injected to stimulate the tissue.

At t2, which is t1+t525, the current i of the first cathodic pulse 525 becomes substantially zero, and remains substantially zero during the interpulse interval, which is tINT. This interval is the same as in FIG. 3A.

At t3, which is t2+tINT, the current provided to the electrode 200 is driven positive to current i551 for a time period (duration) t551— this is the second anodic (balancing) pulse 551. So, during t551, an opposite charge Q2 is injected, configured and arranged to at least partially balance Q1. Most preferably, Q2 is substantially equal to Q1 to provide a high degree of balancing.

At t4, which is t3+t551, the current i of the second anodic pulse 551 becomes substantially zero, and remains substantially zero during until the end of the depicted period t1'.

At t1', the current is driven negative for the subsequent cathodic pulse. The period t4 to t1' may be used for neutralization as described for FIG. 3A.

So in FIG. 3B:
the peak current of the first cathodic pulse i525 is substantially the same as twice the peak current of the second anodic pulse i551 (the average amplitudes are in the ratio 2:1);
the duration of the second anodic pulse t551 is substantially the same as twice the duration of the first cathodic pulse t525 (the durations are in the ratio 1:2); and
in general terms, the device 100 should be configured and arranged such that the cathodic charge Q1 (the peak current of the first cathodic pulse 525 multiplied by the duration) is substantially equal to the anodic charge Q2 (the peak current of the second anodic pulse 551 multiplied by the duration):

$$i525 \times t525(Q1) = i551 \times t551(Q2).$$

For treatment of pain using Peripheral Nerve Stimulation (PNS), suitable pulse parameters may be:
the peak current of the first cathodic pulse i525 is approximately 4 mA, and the peak current of the second anodic pulse i551 is approximately 2 mA.
the duration of the first cathodic pulse t525 is approximately 250 μs (microseconds), and the duration of the second anodic pulse t551 is approximately 500 μs
the time between the trailing edge of the first cathodic pulse 525 and the leading edge of the second anodic pulse 551, or the interval tINT, is approximately 10-100 μs (microseconds).
the time between the leading edge of the first cathodic pulse 525 and the leading edge of the subsequent cathodic pulse, or the repetition rate (t1 to t1') is approximately 50-400 Hz.

Other values for the second anodic pulse 551 may be used, predetermined and/or controlled such that the charge Q2 (i551×t551) is substantially the same. For example:
i551 is approximately 1 mA, t551 is approximately 1000 μs; and
i551 is approximately 0.5 mA, t551 is approximately 2000 μs.

The stimulation control depicted in FIG. 3B may be implemented with two power supplies—one configured to provide the first cathodic pulse 525 and the other configured and arranged to provide the second anodic pulse 551. To achieve an acceptable degree of charge neutralization or charge balancing, the currents i525, i551 and durations t525, t551 should be predetermined and/or controlled as accurately as possible. Typically, programmable power supplies are used.

In applications where cathodic and anodic pulses are intended to be substantially the same for all treatments, additional calibration steps may be included during manufacture to provide a high degree of accuracy for the currents i525, i551 and durations t525, t551. These calibration steps may be repeated at regular intervals to compensate for any drift. However, such calibration steps are not always accurate for implantable device because they may be performed in an environment, such as a factory, which may be very different to the environment in which they are used. This is a particular problem for implantable devices. In addition, implantable devices are intended to operate for months or even years, during which components may age, further reducing the accuracy of the currents i525, i551 and durations t525, t551. The environment that they are being used in may not be constant, and other factors, such as changes in the characteristics of power sources over time, may also need to be compensated. Typically, the power supplies used comprise additional components to perform in-situ calibration and/or additional components are used to monitor the actual currents and durations of the pulses. Additionally or alternatively, anodic and/or cathodic charge may be monitored. As mentioned, any additional components increase both the size and cost of the electronics.

In other applications, cathodic and anodic pulses are intended to be varied for different treatments, or at different phases of the same treatment. To provide a higher degree of accuracy, further additional components may be required in each power supply and/or each pulse generator to implement this degree of flexibility.

Whatever the cause, inaccuracies in the pulse amplitudes and durations may result in a lower degree of charge neutralization or charge balancing. Conventional approaches to improve this require additional components and/or additional manufacturing and/or additional maintenance steps. Additional manufacturing steps may further increase costs. Additional maintenance steps may further increase the costs of operation, or be inconvenient for the user of such a device as they may need to visit a health professional. In some cases, the implantable device may even need to be replaced.

Figure 4A:
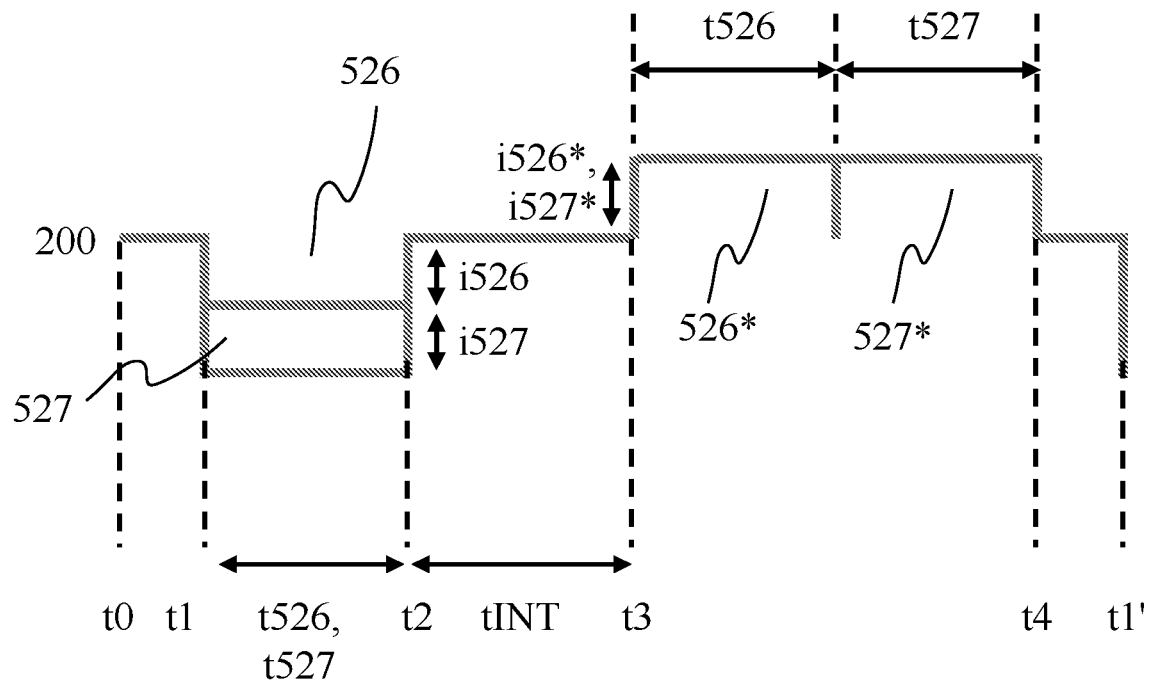
FIGS. 4A and 4B depict further examples of biphasic, cathodic-leading pulses.

FIG. 4A depicts another example of biphasic, cathodic-leading pulses. The second cathodic pulse 526 and the third cathodic pulse 527 are provided substantially concurrently, providing substantially the same cathodic charge Q1 as the first cathodic pulse 525 in FIG. 3B. The anodic pulse 526\*, 527\* in FIG. 4A has substantially the same charge Q2 as the first anodic pulse 551 in FIG. 3B. More specifically:

At t0, the current i is substantially zero.

At t1, the current provided to the one or more electrodes 200 is driven negative to current i526 for a time period t526 with the second cathodic pulse 526. Substantially concurrently, the current provided to the electrode 200 is further driven negative to current i527 for a time period t527 with the third cathodic pulse 527. It may be convenient to provide the second 526 and third 527 cathodic pulse at the same time or with the same duration (this is how they are depicted—approximately simultaneously), but this is not essential. Concurrently means that they overlap to a high degree in time, such that the total average amplitude of the cathodic pulse provided is determined by combining the individual currents i526, i527. In this example, both pulses 526, 527 have the same polarity (cathodic), so the total average amplitude is approximately the sum of the individual currents i526, i527. During t526, t527, a cathodic charge Q1 is injected to stimulate the tissue.

At t2, which is t1+t526, t527 in this example, the current i of the second 526 and third 527 cathodic pulses become substantially zero, and remains substantially zero during the interpulse interval, which is tINT. This interval is the same as in FIG. 3B.

At t3, which is t2+tINT, the current provided to the one or more electrodes 200 is driven positive to current i526* for a time period t526 and further driven positive to i527* for a time period t527—the anodic (balancing) pulse comprises pulses 526* and 527*. The anodic pulse comprises two sub-pulses 526* and 527* which have substantially the same duration t526, t527 as the second 526 and third 527 cathodic pulses. The average amplitude of two sub-pulses i526* and i527* is substantially the same as the second i526 and third i527 cathodic pulses, except for being provided with the opposite polarity.

It may be convenient to provide the anodic pulses 526* and 527* separately or immediately after each other (this is how they are depicted—approximately consecutively), but this is not essential. Separately means that they do not overlap to a high degree in time, such that the average amplitude of the anodic pulse provided is determined by the individual currents i526*, i527*. In this example, both pulses 526*, 527* are consecutive, so the total duration of the anodic pulse is approximately the sum of the individual durations t526, t527.

So, during t3 to t4 (here depicted as t526 followed by t527), an opposite charge Q2 is injected, configured and arranged to at least partially balance Q1. Most preferably, Q2 is substantially equal to Q1 to provide a high degree of balancing.

At t4, which is t3+t526+t527, the current i of the anodic pulse 526*, 527* becomes substantially zero, and remains substantially zero during until the end of the depicted period t1'.

At t1', the current is driven negative for the subsequent cathodic pulse. The period t4 to t1' may be used for neutralization as described for FIG. 3A.

So, as depicted in FIG. 4A:
- the peak current of the cathodic pulse is substantially the same as the peak current i526 of the second cathodic pulse 526 added to the peak current i527 of the third cathodic pulse 527. It is substantially twice the peak current of the anodic sub-pulses 526*, 527* (the average amplitude of the cathodic to anodic pulse is in the ratio 2:1).
- the duration of the anodic sub-pulses t526, t527 are substantially the same as the duration of the cathodic sub-pulses t526, t527. As depicted, the anodic sub-pulses 526*, 527* are provided immediately after each other, so the total duration t526+t527 is approximately twice the duration of the combined cathodic pulse t526, t527.
- in general terms, the device 100 should be configured and arranged such that the cathodic charge Q1 (the peak cathodic current multiplied by the cathodic duration) is substantially equal to the anodic charge Q2 (the peak anodic current multiplied by the anodic duration).

If the cathodic sub-pulses 526, 527 are provided substantially simultaneously, then:

$$Q1=[i526+i527]\times[t526 \text{ or } t527]$$

If the anodic pulses are provided substantially consecutively and the average amplitude of the sub-pulses i526* and i527* are approximately the same, then $$Q2=[i526 \text{ or } i527]\times[t526+t527]$$

However, one of the insights upon which embodiments of the invention is based is that a simpler control of charge neutralization is possible by considering the sub-pulses to be charge components (or building blocks)—each sub-pulse has a predetermined and/or controlled average amplitude and duration provided by a separate power supply. By just applying the sub-pulse with an opposite polarity, the charge applied remains approximately balanced.

So in the example of FIG. 4A, the charge provided by the cathodic pulse is:

$$Q1=\text{sub-pulse } [i526\times t526]+\text{sub-pulse } [i527\times t527]$$

and the charged provided by the cathodic pulse is:

$$Q2=\text{sub-pulse } [i526^*\times t526]+\text{sub-pulse } [i527^*\times t527]$$

By providing the same sub-pulses during the cathodic and anodic pulses, but with the opposite polarity, the degree of accuracy required to control the average amplitudes, duration and timing is reduced. In this configuration, the most critical factor affecting the degree of charge neutralization is the stability (or reproducibility) between the uses of each sub-pulse for the cathodic and anodic pulses—as this interval is quite short, a much simpler power supply may be used, with fewer components. This may mean a reduced cost and a smaller footprint.

Optionally, as described below, a degree of separation in time between the cathodic sub-pulses 526, 527 may be used to generate a more complex cathodic waveform.

Additionally or alternatively, a degree of overlap in time between the anodic sub-pulses 526*, 527* may be used to generate a more complex waveform.

The stimulation control depicted in FIG. 4A may be implemented with:
- a first energy/power supply, configured and arranged to provide the sub-pulse 526 with cathodic polarity, and/or 526* with anodic polarity, and
- a second energy/power supply, configured and arranged to provide the sub-pulse 527 with cathodic polarity, and/or 527* with anodic polarity.

The device 100, and in particular the pulse energy controller 510, may configured and arranged such that:
- the first supply can provide the sub-pulse 526 with a particular peak current i526, i526* for a particular duration t526; and
- the second supply can provide the sub-pulse 527 with a particular peak current i527, i527* for a particular duration t527.

The leading cathodic pulse is provided at t1 by connecting the first supply and the second supply substantially concurrently to the one or more electrodes 200.

If the peak currents i526, i527 have the same polarity, the combined peak current is approximately the sum of the constituent currents i526+i527 (as depicted in FIG. 4A). If the peak currents i526, i527 have opposite polarities, the combined peak current is the difference between the constituent currents i526−i527.

The balancing pulse is provided at t3 by switching the polarity i526* and connecting the first supply with the one or more electrodes 200, followed by switching the polarity i527* and connecting the second supply with the one or more electrodes 200. If the pulses 526*, 527* are applied substantially consecutively, the combined duration is the sum of the durations t526+t527 (as depicted in FIG. 4A). If the pulses 526*, 527* are applied with an overlap in time (at least partly consecutively) and the same polarity, the combined peak current is the sum of the pulse peak currents i526*+i527* during the time that the pulses overlap.

The energy output of each supply may be made substantially constant—the only difference in use is the polarity which is applied to the one or more electrodes 200. As the same supplies are used for both the cathodic and anodic pulses, the anodic and cathodic charges are substantially equal. By applying them substantially concurrently for the cathodic pulse and substantially consecutively for the anodic pulse, the average amplitude of the anodic pulse may be approximately half the average amplitude of the cathodic pulse to reduce the chance of reduction in therapeutic effect.

Although the sub-pulses are depicted in FIG. 4A with the same average amplitude i526, i527 and duration t526, t527, this is not essential. Different average amplitudes i526, i527 may be used and different durations t526, t527—as long as the total charge applied by each power supply during the cathodic pulse is substantially the same as the total charge applied during the anodic pulse, a high degree of charge neutralization may be achieved. The skilled person will also realize that the pulses are schematically depicted as square waves to explain the principle of embodiments of the invention—in practice, the waveforms used may be more complex and less ideal. However, the skilled person will be able to determine by calculation, simulation and/or measurement, the charge supplied during each sub-pulse.

Programmable power supplies may be used to provide additional flexibility in predetermining and/or controlling the average amplitudes and/or pulse durations.

Figure 4B:
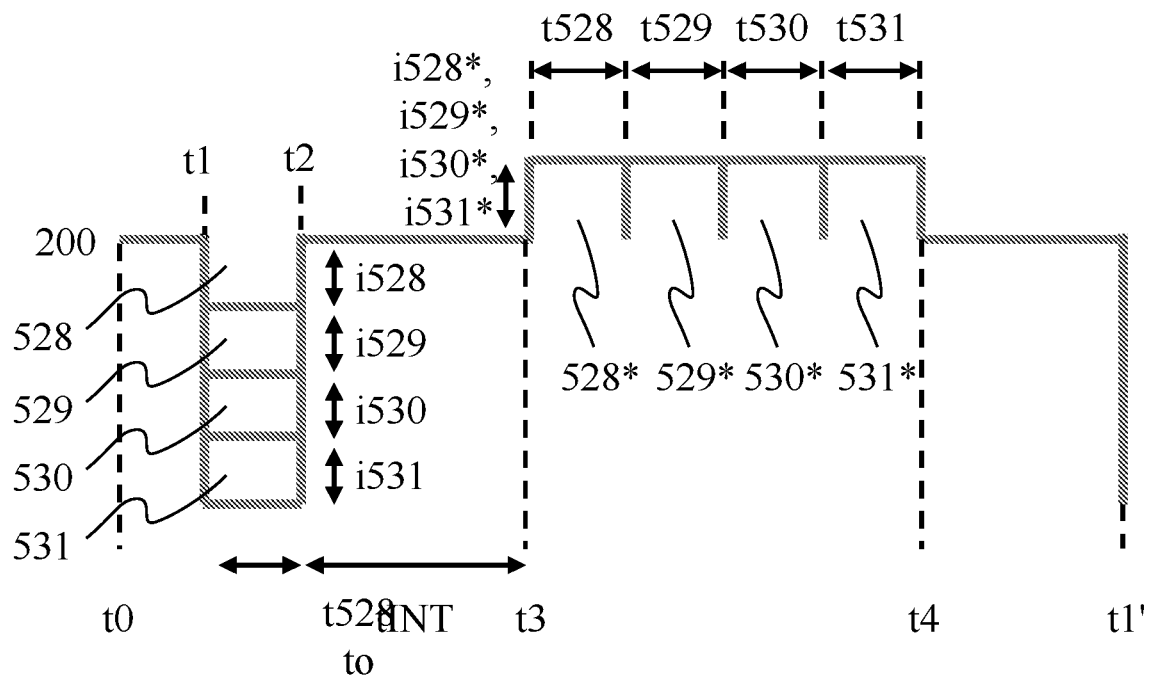

FIG. 4B depicts another example of biphasic, cathodic-leading pulses. It is similar in principle to the example of FIG. 4A, except four sub-pulses and four power supplies) are used instead of two.

The fourth cathodic pulse 528, the fifth cathodic pulse 529, the sixth cathodic pulse 530, and the seventh cathodic pulse 531 are provided substantially concurrently, providing a cathodic charge Q1. More specifically:

At t0, the current i is substantially zero.

At t1, the current provided to the electrode 200 is driven negative by substantially concurrent sub-pulses. In this example, they have the same polarity, so the total average amplitude of the cathodic pulse is approximately the sum of the average amplitudes of the cathodic sub-pulses:
  current i528 for a time period t528 with the fourth cathodic pulse 528;
  current i529 for a time period t529 with the fifth cathodic pulse 529;
  current i530 for a time period t530 with the sixth cathodic pulse 530; and
  current i531 for a time period t531 with the seventh cathodic pulse 531.

Thea cathodic charge Q1 injected to stimulate the tissue is:

[$i529 \times t529$]+[$i530 \times t530$]+[$i531 \times t531$]+[$i532 \times t532$]

As in FIG. 4A, the cathodic sub-pulses are depicted as being provided approximately simultaneously, but this is not essential. At t2, which is t1+t528, t529, t530, t531 in this example, the current i of the cathodic sub-pulses become substantially zero, and remain substantially zero during the interpulse interval, which is tINT. This interval is the same as in FIG. 4A.

At t3, which is t2+tINT, the current provided to the one or more electrodes 200 is driven positive by separate sub-pulses. In this example, they have the same polarity and are provided immediately after each other (as in FIG. 4A, this is not essential), so the total duration of the anodic pulse is approximately the sum of the individual durations:
  current i528* for a time period t528 as anodic sub-pulse 528*;
  current i529* for a time period t529 as anodic sub-pulse 529*;
  current i530* for a time period t530 as anodic sub-pulse 530*, and
  current i531* for a time period t531 as anodic sub-pulse 531*.

An opposite charge Q2 is injected, configured and arranged to at least partially balance Q1. Most preferably, Q2 is substantially equal to Q1 to provide a high degree of balancing. As depicted, Q2 is:

[$i528^* \times t528$]+[$i529^* \times t529$]+[$i530^* \times t530$]+[$i531^* \times t531$]

At t4, which is t3+t538+t529+t530+t531 in this example, the current i of the anodic pulse becomes substantially zero, and remains substantially zero during until the end of the depicted period t1'.

At t1', the current is driven negative for the subsequent cathodic pulse. The period t4 to t1' may be used for neutralization as described for FIG. 3A.

The stimulation control depicted in FIG. 4B may be implemented with:
  a first energy/power supply, configured and arranged to provide the sub-pulse 529 with cathodic polarity, and/or 529* with anodic polarity;
  a second energy/power supply, configured and arranged to provide the sub-pulse 530 with cathodic polarity, and/or 530* with anodic polarity;
  a third energy/power supply, configured and arranged to provide the sub-pulse 531 with cathodic polarity, and/or 531* with anodic polarity, and
  a fourth energy/power supply, configured and arranged to provide the sub-pulse 532 with cathodic polarity, and/or 532* with anodic polarity.

The device 100, and in particular the pulse energy controller 510, may configured and arranged such that:
  the first supply can provide the sub-pulse 528 with a particular peak current i528, i528* for a particular duration t528;
  the second supply can provide the sub-pulse 529 with a particular peak current i529, i529* for a particular duration t529;
  the third supply can provide the sub-pulse 530 with a particular peak current i530, i530* for a particular duration t530; and
  the fourth supply can provide the sub-pulse 531 with a particular peak current i531, i531* for a particular duration t531.

The leading cathodic pulse is provided at t1 by connecting the first, second, third and fourth supplies substantially concurrently to the one or more electrodes 200. If the peak currents i528, i529, i530, i531 have the same polarity, the combined peak current is approximately the sum of the constituent currents i528+i529+i530+i531 (as depicted in FIG. 4B). If the peak currents i528, i529, i530, i531 have opposite polarities, the combined peak current is the difference between the constituent currents i529–i531.

The balancing pulse is provided at t3 by switching the polarity i528* and connecting the first supply with the one or more electrodes 200, followed by switching the polarity i529* and connecting the second supply with the one or more electrodes 200, followed by switching the polarity i530* and connecting the third supply with the one or more electrodes 200, and followed by switching the polarity i531* and connecting the fourth supply with the one or more electrodes 200. If the pulses 528*, 529*, 530*, 531* are applied substantially consecutively, the combined duration is the sum of the durations t528+t529+t530+t531 (as depicted in FIG. 4B). If the pulses 528*, 529*, 530*, 531* are applied with an overlap in time (at least partly consecutively) and the same polarity, the combined peak current is the sum of the pulse peak currents i528*, +i529*+i530*+i531* during the time that the pulses overlap.

By applying them substantially concurrently for the cathodic pulse and substantially consecutively for the anodic pulse, the average amplitude of the anodic pulse may be approximately one quarter the average amplitude of the cathodic pulse to further reduce the chance of a reduction in therapeutic effect.

The energy/power supplies may be, for example current sources. Each current source may be programmable—for example, a 6-bit instruction may be used to set the nominal output current, with a step size of 40 uA, providing up to 2.5 mA per supply. The charge to be provided by each power supply may be predetermined and/or controlled. During use, the nominal output current remains substantially constant— it is applied for a fixed duration during the cathodic pulse and for the same duration, with the opposite polarity, during the anodic pulse.

The current sources may preferably be configured to have a large output impedance—for example, by using switched cascode Nfets. A large output impedance may provide a higher degree of source stability during stimulation and balancing pulses.

Figure 8:
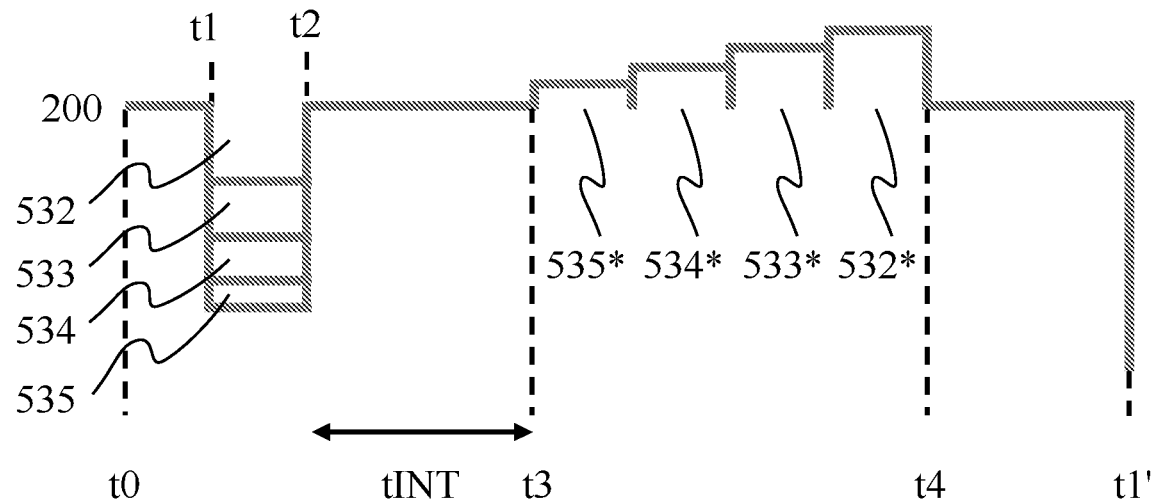
FIG. 8 depicts a further example of biphasic, cathodic-leading pulses.

FIG. 8 depicts a further example of biphasic, cathodic-leading pulses. It is similar in principle to the example of FIG. 4B, except that the nominal average amplitudes of the four power supplies are different, allowing complex waveforms to be provided.

The eighth cathodic pulse 532, the ninth cathodic pulse 533, the tenth cathodic pulse 534, and the eleventh cathodic pulse 535 are provided substantially concurrently, providing a cathodic charge Q1. More specifically:

At t0, the current i is substantially zero.

At t1, the current provided to the electrode 200 is driven negative by substantially concurrent sub-pulses. In this example, they have the same polarity, so the total average amplitude of the cathodic pulse is approximately the sum of the average amplitudes of the cathodic sub-pulses:

current i535 for a time period t535;
current i534 for a time period t534, where the current i534 is approximately twice the current i535 (=2×i535);
current i533 for a time period t533, where the current i533 is approximately twice the current i534 (=4×i535); and
current i532 for a time period t532, where the current i532 is approximately twice the current i533 (=8×i535).

The cathodic charge Q1 injected to stimulate the tissue is:

[i532×t532]+[i533×t533]+[i534×t534]+[i535×t535].

As in FIG. 4B, the cathodic sub-pulses are depicted as being provided approximately simultaneously, but this is not essential.

At t2, which is t1+t532, t533, t534, t535 in this example, the current i of the cathodic sub-pulses become substantially zero, and remain substantially zero during the interpulse interval, which is tINT. This interval is the same as in FIG. 4B.

At t3, which is t2+tINT, the current provided to the one or more electrodes 200 is driven positive by separate sub-pulses. In this example, they have the same polarity and are provided immediately after each other (as in FIG. 4B, this is not essential), so the total duration of the anodic pulse is approximately the sum of the individual durations:

current i535* for a time period t535 as anodic sub-pulse 535*;
current i534* for a time period t534 as anodic sub-pulse 534*;
current i533* for a time period t533 as anodic sub-pulse 533*; and
current i532* for a time period t532 as anodic sub-pulse 532*.

In this case, the order of the anodic sub-pulses is selected to provide a steadily increasing average amplitude, from i535* to i532*.

An opposite charge Q2 is injected, configured and arranged to at least partially balance Q1. Most preferably, Q2 is substantially equal to Q1 to provide a high degree of balancing. As depicted, Q2 is:

[i535*×t535]+[i534*×t534]+[i533*×t533]+ [i532*×t532]

At t4, which is t3+t535+t534+t533+t532 in this example, the current i of the eighth anodic pulse 557 becomes substantially zero, and remains substantially zero during until the end of the depicted period t1'.

At t1', the current is driven negative for the subsequent cathodic pulse. The period t4 to t1' may be used for neutralization as described for FIG. 3A.

So in FIG. 8:
the peak current of the cathodic pulse is substantially the same as the peak current of the cathodic sub-pulses, which is approximately 15×i535.

It is approximately fifteen times the peak current of the first part of the anodic pulse (535*) and approximately twice times the peak current of the last part of the anodic pulse (532*).

The skilled person will realise that the second embodiment 510 of a pulse energy controller may be optionally modified to operate with one or more DC-blocking capacitors, electrically connected in series with the one or more return electrodes 400.

Additionally, the pulse energy controller 500, 510 may be further configured and arranged to receive parameters and/or instructions from a user interface. Additionally or alternatively, the user interface may be comprised in a mobile device, such as a mobile telephone.

The one or more parameters and/or instructions may predetermine and/or control one or more corresponding characteristic of one or more electrical stimulation pulses. For example: a pulse average amplitude, a pulse width, a period, a duty cycle, a number of pulses to be provided, a number of pulses to be repeated, a duration of pulses, a start time, an end time, a voltage, a current, an energy, a charge, a dose, or any combination thereof.

Most of the examples and embodiments in this disclosure describe biphasic operation, where a stimulation charge is provided, followed by a balancing charge. The first pulse, for stimulation, is described as cathodic, followed by a second, anodic pulse.

Figure 9:
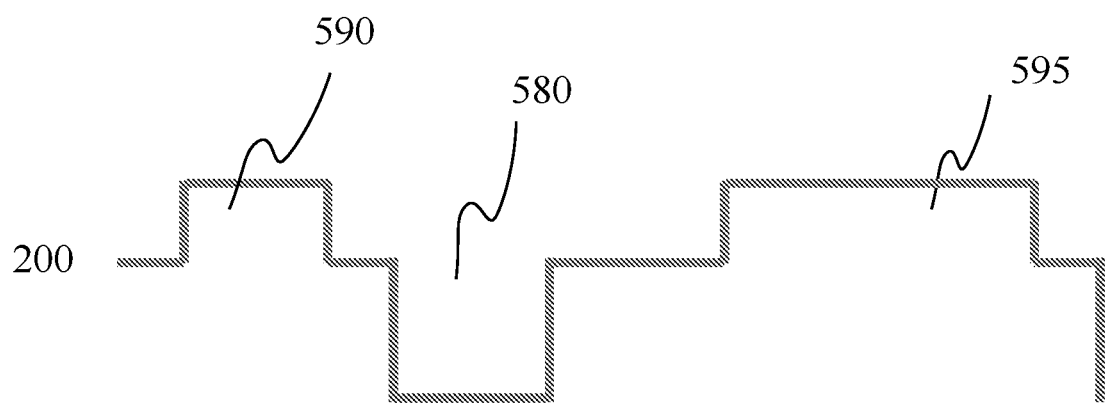
FIG. 9 depicts a further alternative where the balancing pulse is separated into two pulse parts.

Alternatives include:
  the first pulse may be anodic and the second pulse (the balancing pulse) may be cathodic;
  the first pulse and the second pulse may have the same polarity; and
  the duration and average amplitude may be different per supply FIG. 9 depicts a further alternative—the balancing pulse may be separated into two pulse parts—one pulse part 590 may be provided before the stimulation pulse 580, and the other pulse part 595 afterwards. In other words, to provide two balancing pulse parts 590, 595 with a predetermined and/or controlled time interval between them; and to provide the stimulation pulse 580 during that time interval. This may also be described as tri-phasic. The pulse parts 590, 595 may be substantially the same, or different—however, for a high degree of charge balancing, the total charge of the balancing pulse 590, 595 is substantially the same as the charge of the stimulation pulse 580.

This may be advantageous as it may reduce any residual charge that builds up over several cycles. For example, tissue impedance has a Faradaic component which may result in a "leak"—when delays are long between stimulation pulses 580 (for example, much greater than 100 microseconds), this may be an important cause of residual charge. Removal of any residual charge may be advantageous in applications where an action potential measured after a bi-phasic pulse cycle.

The skilled person will also realise that the stimulation pulse may be separated into two pulse parts (not depicted)—one pulse part may be provided before the balancing pulse, and the other pulse part afterwards. In other words, to provide two stimulation pulse parts with a predetermined and/or controlled time interval between them; and to provide the balancing pulse during that time interval. This may also be described as tri-phasic. The stimulation pulse parts may be substantially the same, or different—however, for a high degree of charge balancing, the total charge of the stimulation pulse is substantially the same as the charge of the balancing pulse.

In general, the device 100 may be considered to have three main design restrictions:
  the distal end may be substantially configured and arranged to be implanted proximate the tissue to be stimulated;
  the proximal end may be substantially configured and arranged to provide suitable electrical energy; and
  one or more electrical connections between the proximal end and the distal end of the device 100.

Depending on the type of stimulation and the implantation positions on the human or animal body, the device 100 may be optimized to comply with one of the design restrictions, or comprises may be made based on two or more design restrictions. For example, when stimulating nerves on the forehead, a longer substrate 300 (longer lead) may be used such that the proximal end may be disposed close to an ear or at the back of the head. The skilled person will also realize that the one or more stimulation electrodes 200 may be provided proximate the pulse energy controller 500, 510.

Figure 5:
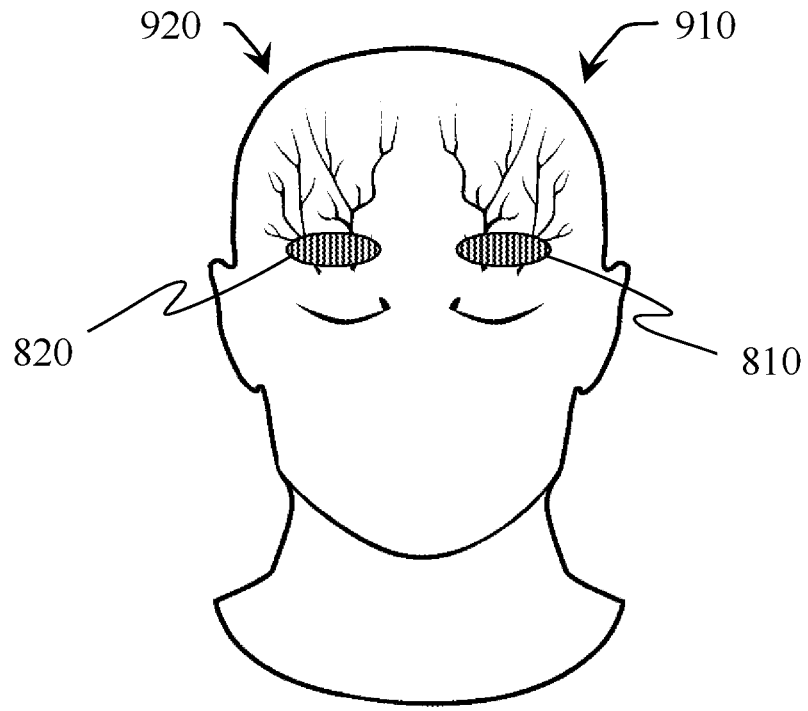
FIG. 5 and FIG. 6 depict examples of nerves that may be stimulated to treat headaches.
Figure 6:
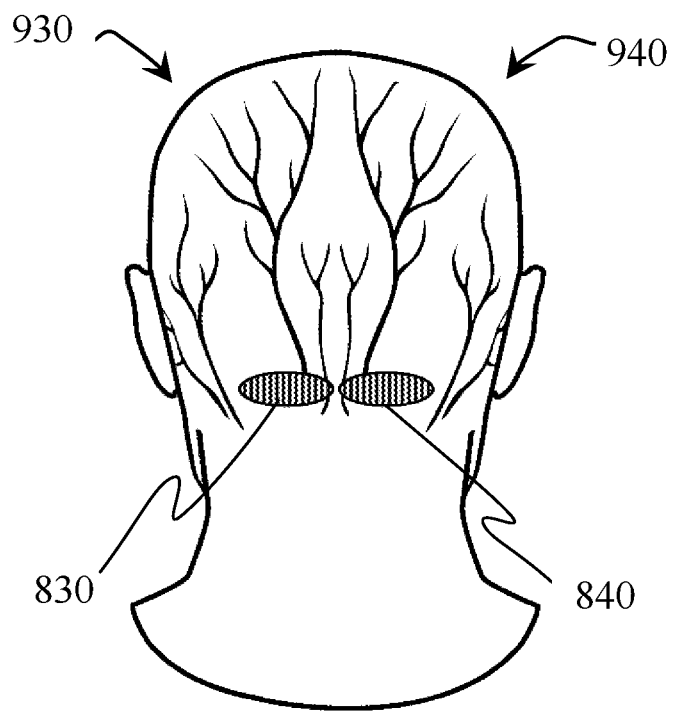

FIG. 5 and FIG. 6 depict examples of nerves that may be stimulated using a suitably configured device 100 with an implantable distal end. It may provide neurostimulation to treat, for example, headaches or primary headaches.

FIG. 5 depicts the left supraorbital nerve 910 and right supraorbital nerve 920 which may be electrically stimulated using a suitably configured device. FIG. 6 depicts the left greater occipital nerve 930 and right greater occipital nerve 940 which may also be electrically stimulated using a suitably configured device 100.

Depending on the size of the region to be stimulated and the dimensions of the part of the device to be implanted, a suitable location is determined to provide the electrical stimulation required for the treatment. Approximate implant locations for the distal part of the stimulation device comprising stimulation devices 100 are depicted as regions:
  location 810 for left supraorbital stimulation and location 820 for right supraorbital stimulation for treating chronic headache such as migraine and cluster.
  location 830 for left occipital stimulation and location 840 for right occipital stimulation for treating chronic headache such as migraine, cluster, and occipital neuralgia.

In many cases, these will be the approximate locations 810, 820, 830, 840 for the implantable part of the device 100, 150.

For each implant location, 810, 820, 830, 840 a separate stimulation system may be used. Where implant locations 810, 820, 830, 840 are close together, or even overlapping, a single stimulation system may be configured to stimulate at more than one implant location 810, 820, 830, 840.

A plurality of stimulation devices 100 may be operated separately, simultaneously, sequentially or any combination thereof to provide the required treatment.

Figure 7:
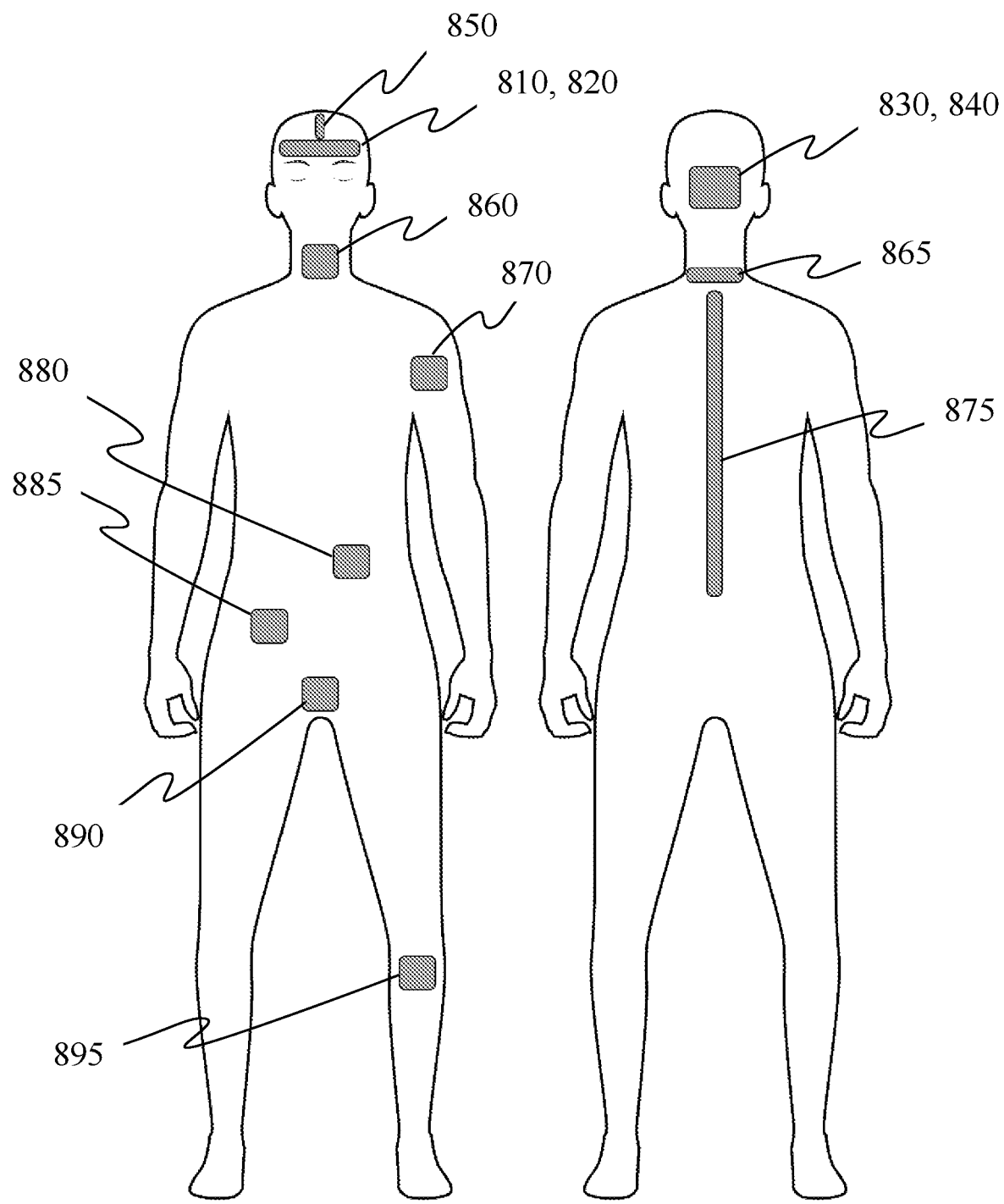
FIG. 7 depicts examples of nerves that may be stimulated for other treatments.

FIG. 7 depicts further examples of nerves that may be stimulated using a suitably configured stimulation device 100 to provide neurostimulation to treat other conditions. The locations depicted in FIG. 5 and FIG. 6 (810, 820, 830, 840) are also depicted in FIG. 7.

Depending on the size of the region to be stimulated and the dimensions of the part of the device to be implanted, a suitable location is determined to provide the electrical stimulation required for the treatment. Approximate implant locations for the part of the stimulation device comprising stimulation electrodes are depicted as regions:
  location 810 for cortical stimulation for treating epilepsy;
  location 850 for deep brain stimulation for tremor control treatment in Parkinson's disease patients; treating dystonia, obesity, essential tremor, depression, epilepsy, obsessive compulsive disorder, Alzheimer's, anxiety, bulimia, tinnitus, traumatic brain injury, Tourette's, sleep disorders, autism, bipolar; and stroke recovery
  location 860 for vagus nerve stimulation for treating epilepsy, depression, anxiety, bulimia, obesity, tinnitus, obsessive compulsive disorder and heart failure;
  location 860 for carotid artery or carotid sinus stimulation for treating hypertension;
  location 860 for hypoglossal & phrenic nerve stimulation for treating sleep apnea;
  location 865 for cerebral spinal cord stimulation for treating chronic neck pain;
  location 870 for peripheral nerve stimulation for treating limb pain, migraines, extremity pain;
  location 875 for spinal cord stimulation for treating chronic lower back pain, angina, asthma, pain in general;
  location 880 for gastric stimulation for treatment of obesity, bulimia, interstitial cystitis;

location 885 for sacral & pudendal nerve stimulation for treatment of interstitial cystitis;
location 885 for sacral nerve stimulation for treatment of urinary incontinence, fecal incontinence;
location 890 for sacral neuromodulation for bladder control treatment; and
location 895 for fibular nerve stimulation for treating gait or footdrop.

Other condition that may be treated include gastroesophageal reflux disease and inflammatory diseases.

The descriptions thereof herein should not be understood to prescribe a fixed order of performing the method steps described therein. Rather the method steps may be performed in any order that is practicable. Similarly, the examples are used to explain the algorithm, and are not intended to represent the only implementations of these algorithms—the person skilled in the art will be able to conceive many different ways to achieve the same functionality as provided by the embodiments described herein.

It will be obvious to a person skilled in the art that the method may be implemented on any type of standalone device, distributed system, client-server compatible system or any combination thereof containing any type of client, network, server, processor, memory and/or database elements.

In particular, functions of the stimulation device may be implemented as two or more separate hardware elements, connected through suitable wired and/or wireless connections. Such hardware elements may be configured and arranged for implantation and/or external dispositions.

In general, the embodiments of the devices described in this disclosure may be configured and arranged to stimulate one or more nerves, one or more muscles, one or more organs, spinal cord tissue, and any combination thereof.

In general, for any of the configurations described and depicted in this disclosure, any electrode 200, 400 may be connected as either a stimulating 200 or return electrode 400. This may be advantageous if it is uncertain whether the implantable distal end is above or below the targeted tissue—for example, above or below a nerve.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

For example, a device that is suitable for operating according to the methods described herein is a tissue stimulation device comprising: one or more stimulation electrodes, configured to transmit energy, in use, to human or animal tissue as one or more stimulation pulses; a pulse energy controller, configured and arranged to transfer electrical energy, during use, as one or more electrical stimulation pulses to the one or more stimulation electrodes; wherein the pulse energy controller further comprises two or more stimulation energy supplies, configured and arranged to supply electrical energy substantially concurrently to the one or more stimulation electrodes from the two or more stimulation energy supplies as a first pulse; and to supply electrical energy separately to the one or more stimulation electrodes from the two or more stimulation energy supplies as a second pulse.

REFERENCE NUMBERS USED IN DRAWINGS

100 a stimulation device
200 one or more stimulation electrodes
250 one or more electrical interconnections
300 an elongated substrate
310 a first substantially planar transverse surface
320 a second substantially planar transverse surface
400 one or more return electrodes
425 one or more DC-blocking capacitors
500 a first embodiment of a pulse energy controller
510 a second embodiment of a pulse energy controller
525 a first cathodic pulse
i525 the peak current of the first cathodic pulse
t525 the duration of the first cathodic pulse
526 a second cathodic pulse
i526 the peak current of the second cathodic pulse
t526 the duration of the second cathodic pulse
527 a third cathodic pulse
i527 the peak current of the third cathodic pulse
t527 the duration of the third cathodic pulse
528 a fourth cathodic pulse
i528 the peak current of the fourth cathodic pulse
t528 the duration of the fourth cathodic pulse
529 a fifth cathodic pulse
i529 the peak current of the fifth cathodic pulse
t529 the duration of the fifth cathodic pulse
530 a sixth cathodic pulse
i530 the peak current of the sixth cathodic pulse
t530 the duration of the sixth cathodic pulse
531 a seventh cathodic pulse
i531 the peak current of the seventh cathodic pulse
t531 the duration of the seventh cathodic pulse
550 a first anodic pulse
i550 the peak current of the first anodic pulse
t550 the duration of the first anodic pulse
551 a second anodic pulse
i551 the peak current of the second anodic pulse
t551 the duration of the second anodic pulse
580 stimulating pulse
590 first pulse part—balancing pulse
595 second pulse part—balancing pulse
tINT the interpulse interval
601 first stimulation energy supply
602 second stimulation energy supply
603 third stimulation energy supply
604 fourth stimulation energy supply
700 a longitudinal axis
720 a first transverse axis
750 a second transverse axis
810 location for left supraorbital nerve or cortical stimulation
820 location for right supraorbital stimulation
830 location for left occipital nerve stimulation
840 location for right occipital nerve stimulation
850 location for deep brain stimulation
860 location for vagus nerve, carotid artery, carotid sinus, phrenic nerve or hypoglossal stimulation
865 location for cerebral spinal cord stimulation
870 location for peripheral nerve stimulation
875 location for spinal cord stimulation
880 location for gastric stimulation
885 location for sacral & pudendal nerve stimulation
890 location for sacral neuromodulation
895 location for fibular nerve stimulation
910 left supraorbital nerve
920 right supraorbital nerve
930 left greater occipital nerve
940 right greater occipital nerve

The invention claimed is:

1. A method of controlling electrical energy provided by a stimulation device to one or more stimulation electrodes comprised in the device, the device comprising:
   a first stimulation electrode, configured to transmit energy, in use, to human or animal tissue as one or more stimulation pulses;
   a pulse energy controller, configured and arranged to transfer electrical energy, during use, as one or more electrical stimulation pulses to the first stimulation electrode,
   the pulse energy controller further comprising two or more stimulation energy supplies;
   wherein the method comprises:
      supplying electrical energy concurrently to the first stimulation electrode from each of the two or more stimulation energy supplies as a first pulse; and
      supplying electrical energy separately to the first stimulation electrode from each of the two or more stimulation energy supplies as a second pulse,
   wherein both the supplying the electrical energy concurrently to the first stimulation electrode and the supplying the electrical energy separately to the first stimulation electrode occur within one complete repetition of a waveform pattern.

2. The method according to claim 1, wherein the method further comprises:
   configuring and arranging the two or more energy supplies to provide electrical energy as:
   a predetermined and/or controlled voltage, a predetermined and/or controlled current, a predetermined and/or controlled energy, a predetermined and/or controlled charge, a predetermined and/or controlled power, or any combination thereof.

3. The method according to claim 1, wherein the first and second pulses have a different polarity.

4. The method according to claim 1, wherein the method further comprises:
   configuring and arranging each of the two or more stimulation energy supplies to supply electrical energy simultaneously as the first pulse.

5. The method according to claim 1, wherein the method further comprises:
   configuring and arranging each of the two or more stimulation energy supplies to supply electrical energy consecutively as the second pulse.

6. The method according to claim 1, wherein the method further comprises:
   configuring and arranging each of the two or more energy supplies to provide pulses as anodic and/or cathodic energy pulses.

7. The method according to claim 1, wherein the method further comprises:
   configuring and arranging each of the two or more energy supplies to provide electrical energy:
   simultaneously, at least partly simultaneously, consecutively, at least partly consecutively, with a predetermined and/or controlled time interval between the pulses, or any combination thereof.

8. The method according to claim 1, wherein the method further comprises:
   configuring and arranging the two or more energy supplies to provide the first and second pulses with an average amplitude ratio of less than or equal to 1:2.

9. The method according to claim 1, wherein the method further comprises:
   configuring and arranging the two or more energy supplies to provide the first and second pulses with an average amplitude ratio that is at least partially determined by the number of energy supplies which may be operated concurrently.

10. The method according to claim 1, wherein the method further comprises:
    configuring and arranging each of the two or more energy supplies to supply electrical energy separately to the first stimulation electrode as a third pulse.

11. The method according to claim 10, wherein the method further comprises:
    configuring and arranging the two or more energy supplies to provide the second and third pulses with a different polarity to the first pulse.

12. The method according to claim 10, wherein the method further comprises:
    configuring and arranging the two or more energy supplies:
    to provide the second and third pulses with a predetermined and/or controlled time interval between them; and
    to provide the first pulse during the time interval.

13. The method according to claim 1, wherein the method further comprises:
    configuring and arranging each of the two or more energy supplies to provide energy pulses of opposite polarity such that the net charge transferred is zero.

14. The method according to claim 1, wherein the device further comprises:
    one or more return electrodes;
    the method further comprising:
       configuring the one or more return electrodes to provide, in use, a corresponding electrical return for the first stimulation electrode.

15. The method according to claim 14, wherein the device further comprises:
    one or more DC-blocking capacitors, electrically connected in series with one or more return electrodes.

16. The method according to claim 1, wherein the method further comprises:
    configuring and arranging the device to electrically short the first stimulation electrode to one or more return electrodes after providing one or more pulses.

17. The method according to claim 1, the method further comprising:
    configuring and arranging the stimulation device for stimulating one or more nerves, one or more muscles, one or more organs, spinal cord tissue, and any combination thereof.

18. The method according to claim 1, the method further comprising:
    configuring and arranging the stimulation device for treatment of headaches, primary headaches, incontinence, occipital neuralgia, sleep apnea, hypertension, gastroesophageal reflux disease, an inflammatory disease, limb pain, leg pain, back pain, lower back pain, phantom pain, chronic pain, epilepsy, an overactive bladder, post-stroke pain, obesity, and any combination thereof.

19. The method according to claim 1, wherein the two or more stimulation energy supplies store and supply power.

* * * * *